(12) United States Patent
Nakayama et al.

(10) Patent No.: US 7,161,183 B2
(45) Date of Patent: Jan. 9, 2007

(54) LIQUID CRYSTAL DISPLAY AND METHOD OF MANUFACTURING THE SAME

(75) Inventors: Takanori Nakayama, Tokyo (JP); Masuyuki Ohta, Tokyo (JP); Masahiko Andou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 7 days.

(21) Appl. No.: 10/982,129

(22) Filed: Nov. 5, 2004

(65) Prior Publication Data

US 2005/0062922 A1 Mar. 24, 2005

Related U.S. Application Data

(63) Continuation of application No. 10/388,834, filed on Mar. 14, 2003, now Pat. No. 6,887,731, which is a continuation of application No. 09/764,197, filed on Jan. 16, 2001, now abandoned.

(30) Foreign Application Priority Data

Jan. 18, 2000 (JP) .............................. 2000-009179

(51) Int. Cl.
*H01L 27/15* (2006.01)
(52) U.S. Cl. ............................ 257/79; 257/88; 257/98; 257/208; 257/E23.141
(58) Field of Classification Search ................ 257/79, 257/88, 98, 208
See application file for complete search history.

(56) References Cited

U.S. PATENT DOCUMENTS 6,452,656 B1* 9/2002 Niwano et al. ............. 349/141
6,839,108 B1* 1/2005 Hirakata et al. ............ 349/114

* cited by examiner

*Primary Examiner*—Zandra V. Smith
*Assistant Examiner*—Christy Novacek
(74) *Attorney, Agent, or Firm*—Townsend and Townsend and Crew LLP

(57) ABSTRACT

A method of manufacturing a liquid crystal display device is intended to decrease the number of manufacturing steps. The liquid crystal display device is arranged so that in each pixel area provided on a liquid-crystal-side surface of one of a pair of substrates disposed to oppose each other with a liquid crystal interposed therebetween, a signal from a drain line is applied to a pixel electrode via a drain electrode and a source electrode which are formed in a layer overlying a semiconductor layer of a thin film transistor, by the supply of a scanning signal from a gate electrode which is positioned as an underlying layer with respect to the semiconductor layer. The method of manufacturing such liquid crystal display device includes the steps of: forming a stacked structure in which the semiconductor layer and a first conductive layer are sequentially stacked in the same pattern, in both an area for forming the drain signal and an area for forming the thin film transistor; and after forming a second conductive layer, by using the same mask, providing separation between the drain electrode and the source electrode of the thin film transistor and also forming the pixel electrode connected to the source electrode.

16 Claims, 13 Drawing Sheets

CROSS SECTION OF ITO(s)/PAS/ITO(c)/DCR/a-Si/SIN/GCR
CONSTRUCTION (DCR/ASI BULK PROCESS)
CORRESPONDING NOS. 1 AND 2

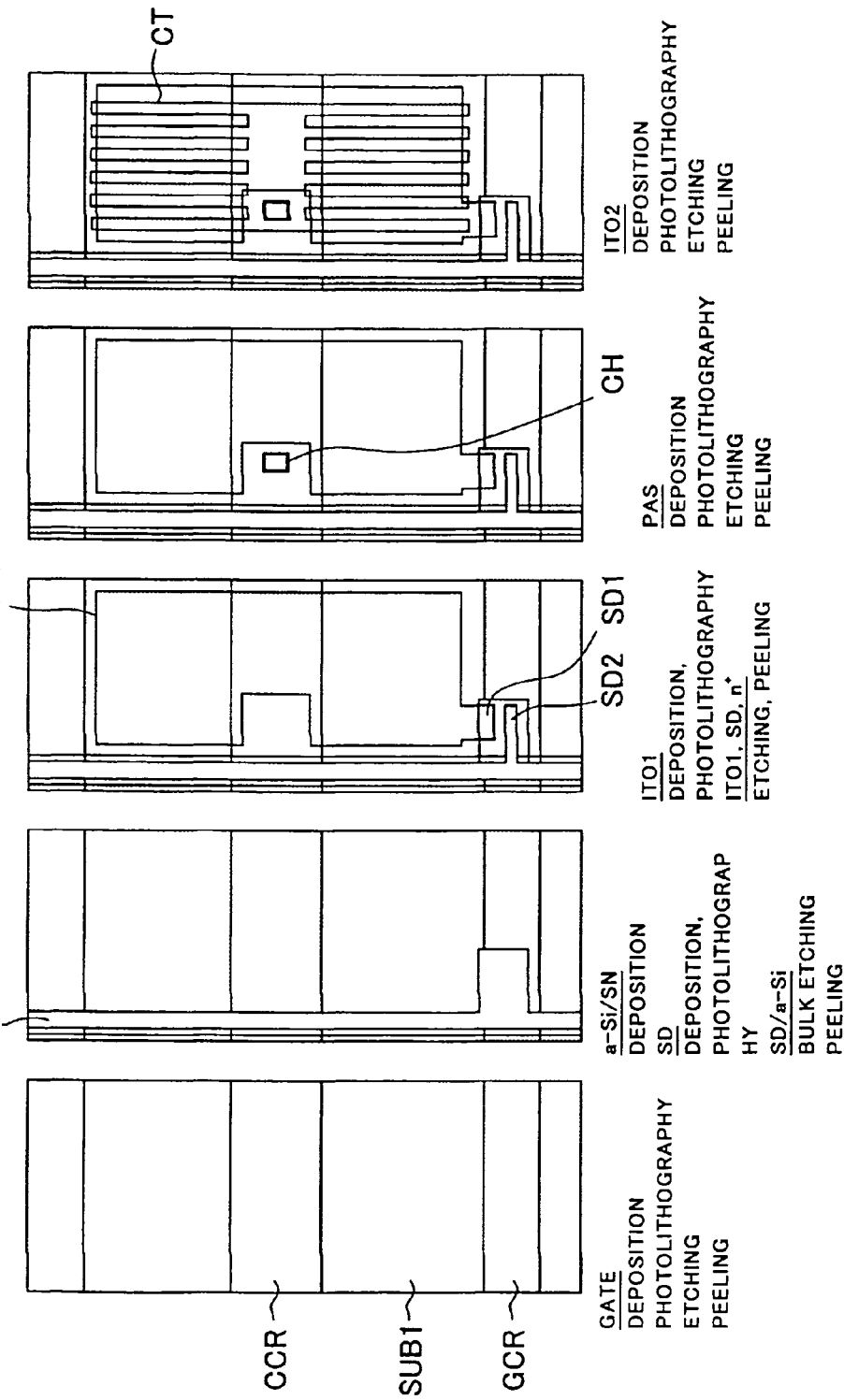

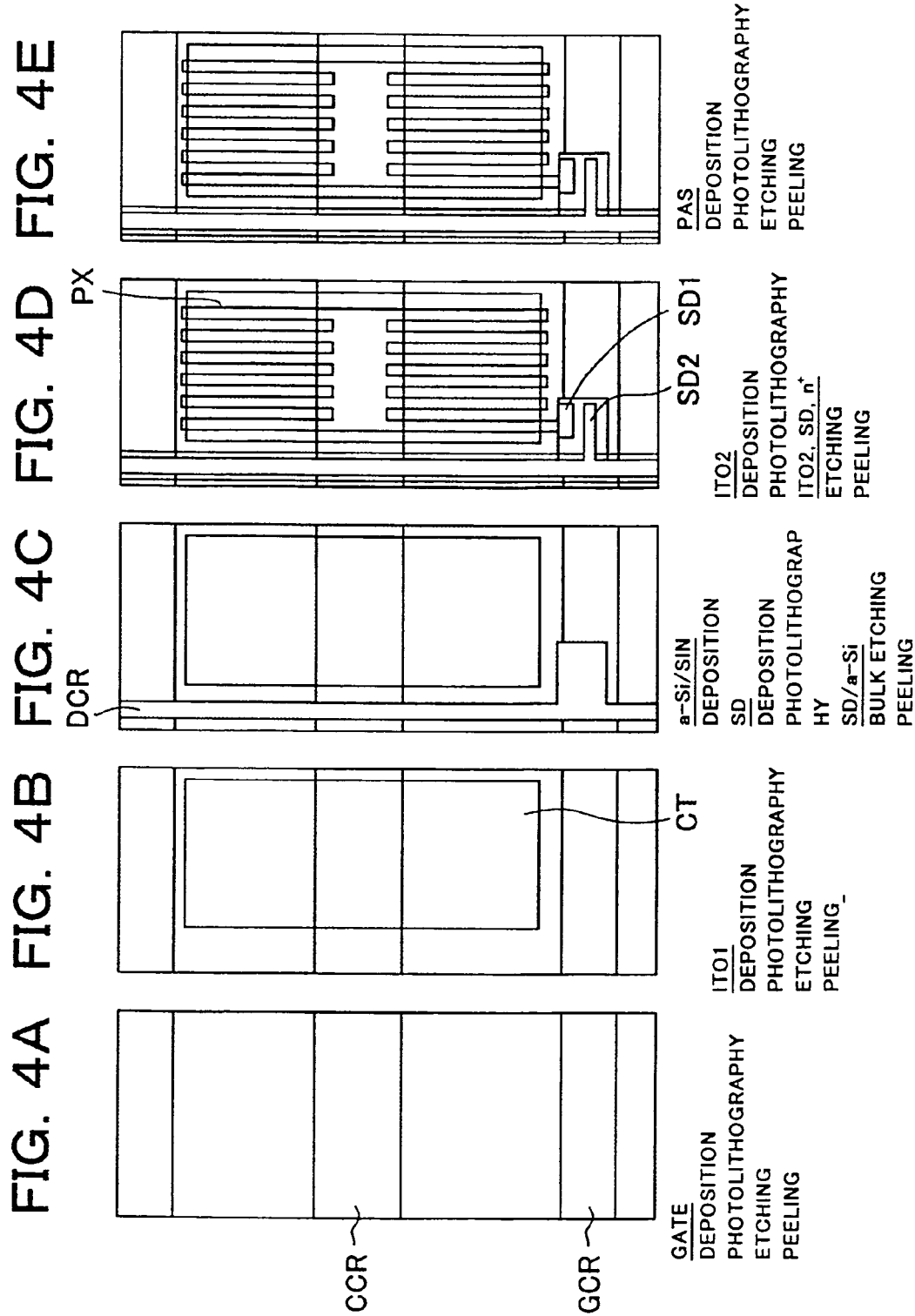

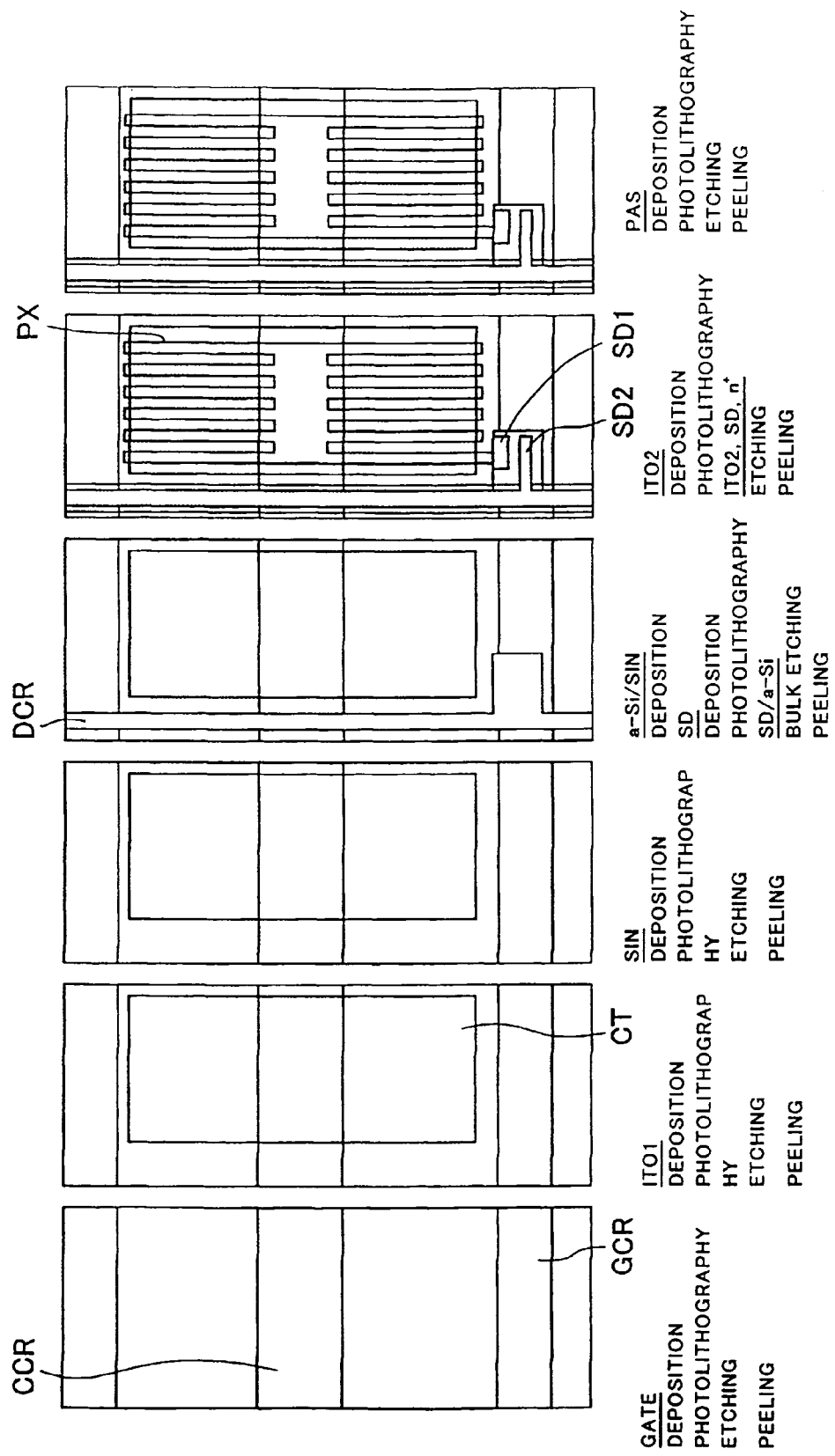

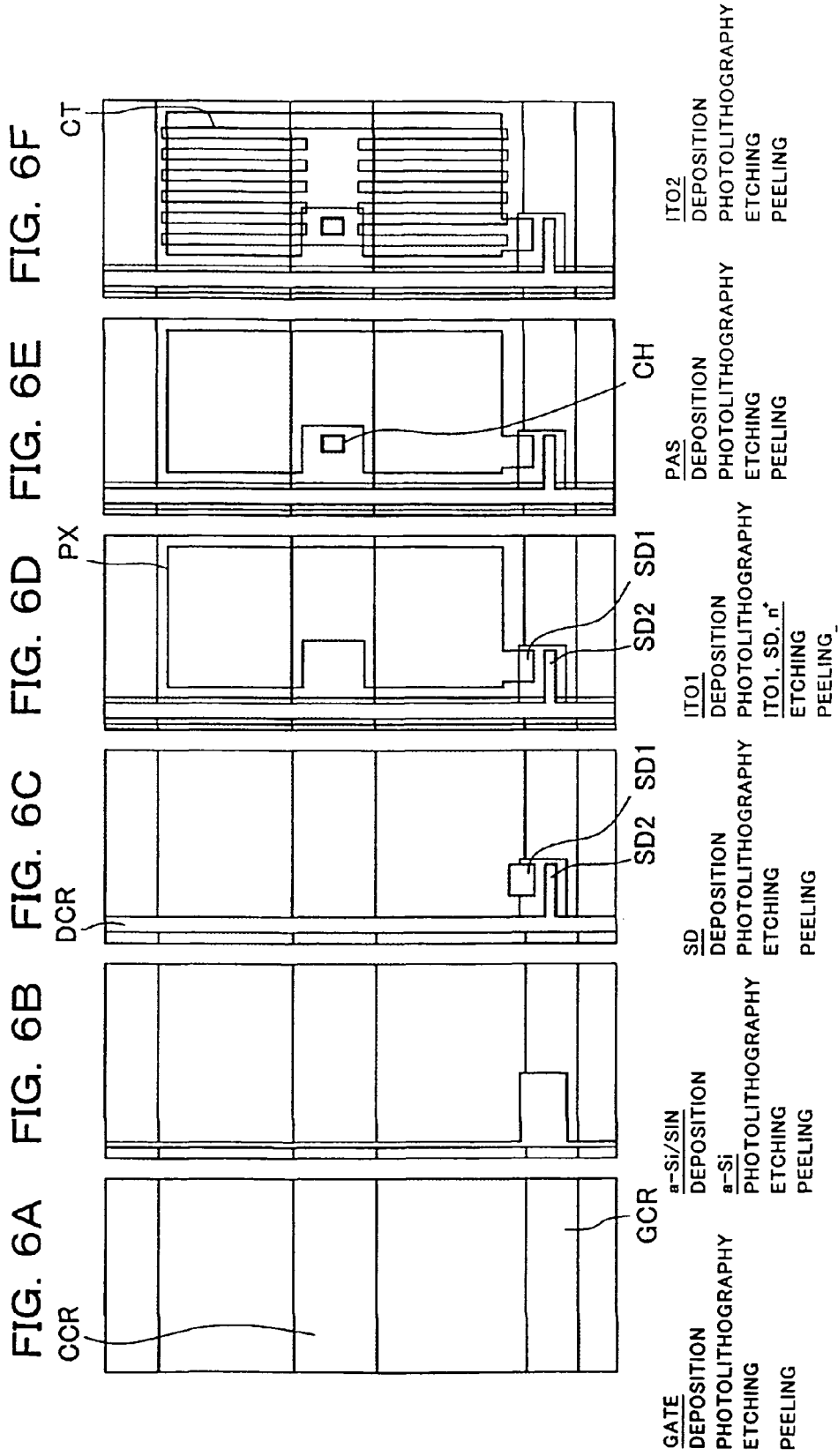

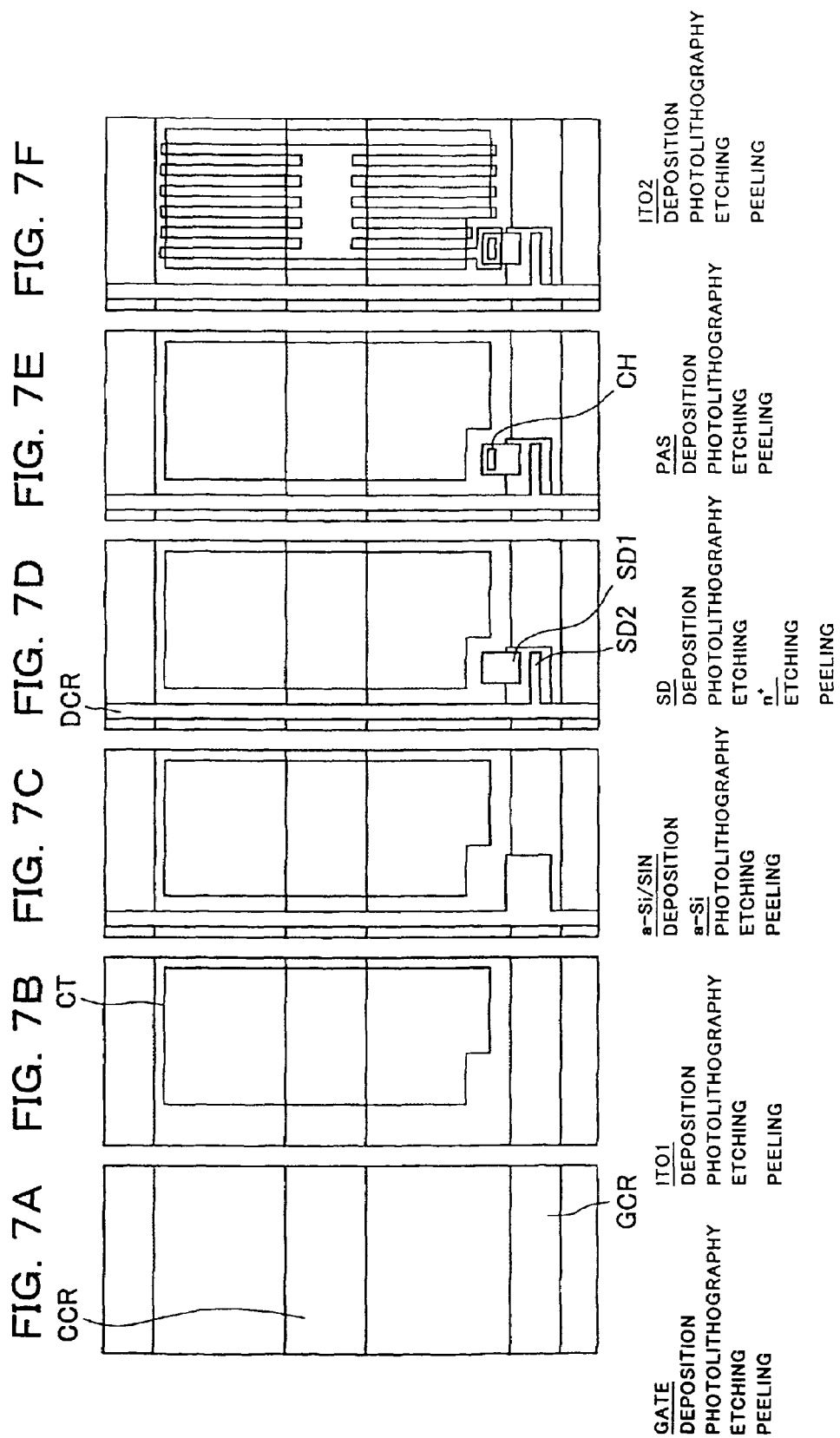

FIG. 8

| NO. | LAYER STRUCTURE | NUMBER OF TIMES OF PHOTOLITHOGRAPHY | MEANS FOR REDUCING NUMBER OF TIMES OF PHOTOLITHOGRAPHY | REMARKS |
|---|---|---|---|---|
| 1 | ITO(s)/PAS/ITO(c)/DCR/a-Si/SIN/GCR | 5 | DCR/ASI BULK PROCESS, PAS/SIN BULK PROCESS | |
| 2 | | 6 | DCR/ASI BULK PROCESS (ADDITION OF SIN PHOTOLITHOGRAPHY OF NO.1) | |
| 3 | | 6 | PAS/SIN BULK PROCESS (ADDITION OF AS PHOTOLITHOGRAPHY OF NO.1) | FIG. 2 |
| 4 | ITO(c)/PAS/ITO(s)/DCR/a-Si/SIN/GCR | 5 | DCR/ASI BULK PROCESS, PAS/SIN BULK PROCESS | |
| 5 | | 6 | DCR/ASI BULK PROCESS (ADDITION OF SIN PHOTOLITHOGRAPHY OF NO.4) | FIG. 5 |
| 6 | | 6 | PAS/SIN BULK PROCESS (ADDITION OF AS PHOTOLITHOGRAPHY OF NO.4) | |
| 7 | ITO(s)/PAS/DCR/ITO(c)/a-Si/SIN/GCR | 6 | PAS/SIN BULK PROCESS | |
| 8 | ITO(c)/PAS/DCR/ITO(s)/a-Si/SIN/GCR | 6 | PAS/SIN BULK PROCESS | |
| 9 | ITO(s)/PAS/DCR/a-Si/ITO(c)/SIN/GCR | 6 | PAS/SIN BULK PROCESS | FIG. 6 |
| 10 | ITO(c)/PAS/DCR/a-Si/ITO(s)/SIN/GCR | 6 | PAS/SIN BULK PROCESS | |
| 11 | ITO(s)/PAS/DCR/a-Si/SIN/ITO(c)/GCR | 6 | PAS/SIN BULK PROCESS | |
| 12 | ITO(c)/PAS/DCR/a-Si/SIN/GCR/ITO(s) | 6 | PAS/SIN BULK PROCESS | |
| 13 | PAS/ITO(s)/DCR/a-Si/SIN/ITO(c)/GCR | 5 | DCR/ASI BULK PROCESS, PAS/SIN BULK PROCESS (ONLY PERIPHERY) | FIG. 3 |
| 14 | | 6 | DCR/ASI BULK PROCESS (ADDITION OF SIN PHOTOLITHOGRAPHY OF NO.13) | FIG. 4 |
| 15 | | 6 | PAS/SIN BULK PROCESS (ADDITION OF ASI PHOTOLITHOGRAPHY OF NO.13) | |
| 16 | PAS/DCR/a-Si/SIN/ITO(c)/GCR | 6 | PAS/SIN BULK PROCESS (ONLY PERIPHERY) | |
| 17 | PAS/DCR/a-Si/ITO(s)/SIN/ITO(c)/GCR | 6 | PAS/SIN BULK PROCESS (ONLY PERIPHERY) | |
| 18 | PAS/ITO(s)/DCR/a-Si/SIN/GCR/ITO(c) | 5 | DCR/ASI BULK PROCESS, PAS/SIN BULK PROCESS (ONLY PERIPHERY) | |
| 19 | | 6 | DCR/ASI BULK PROCESS (ADDITION OF SIN PHOTOLITHOGRAPHY OF NO.18) | |
| 20 | | 6 | PAS/SIN BULK PROCESS (ADDITION OF ASI PHOTOLITHOGRAPHY OF NO.18) | |
| 21 | PAS/DCR/a-Si/SIN/GCR/ITO(c) | 6 | PAS/SIN BULK PROCESS (ONLY PERIPHERY) | |
| 22 | PAS/DCR/a-Si/ITO(s)/SIN/GCR/ITO(c) | 6 | PAS/SIN BULK PROCESS (ONLY PERIPHERY) | |

FIG. 9
CROSS SECTION OF ITO(s)/PAS/ITO(c)/DCR/a-Si/SIN/GCR
CONSTRUCTION (DCR/ASI BULK PROCESS)
CORRESPONDING NOS. 1 AND 2
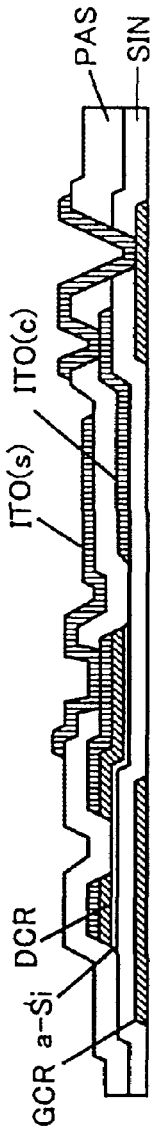
FIG. 10
CROSS SECTION OF ITO(s)/PAS/ITO(c)/DCR/a-Si/SIN/GCR
CROSS SECTION OF ITO(s)/PAS/ITO(c)/a-Si/SIN/GCR
CROSS SECTION OF ITO(s)/PAS/DCR/a-Si/ITO(c)/SIN/GCR
CORRESPONDING NOS. 3, 7 AND 9
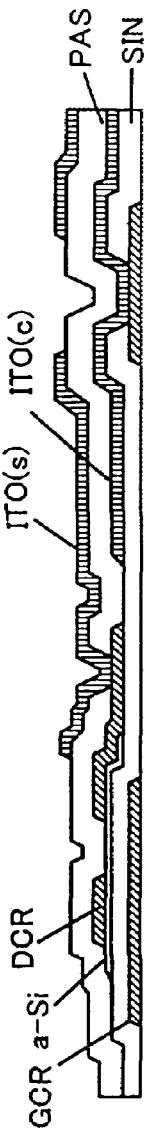
FIG. 11
CROSS SECTION OF ITO(c)/PAS/ITO(s)/DCR/a-Si/SIN/GCR
CORRESPONDING NOS. 4 AND 5
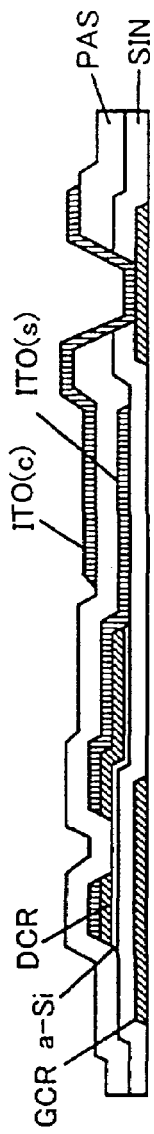

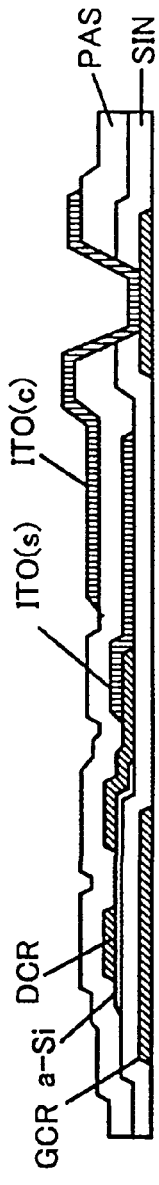
FIG. 12  CROSS SECTION OF ITO(c)/PAS/ITO(s)/DCR/a-Si/SIN/GCR CORRESPONDING NO. 6
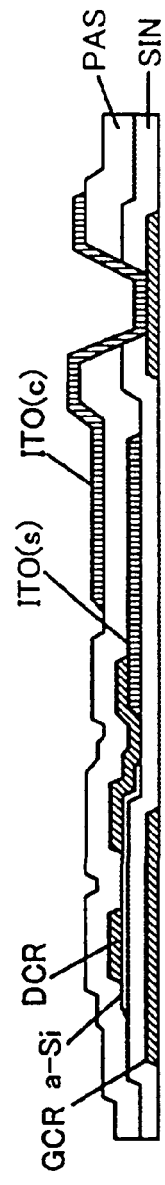
FIG. 13  CROSS SECTION OF ITO(c)/PAS/DCR/ITO(s)/a-Si/SIN/GCR CROSS SECTION OF ITO(c)/PAS/DCR/a-Si/ITO(s)/SIN/GCR CORRESPONDING NOS. 8 AND 10
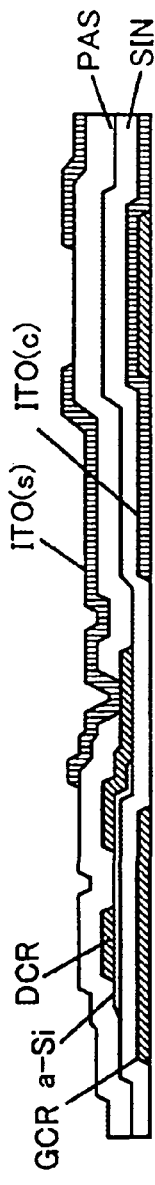
FIG. 14  CROSS SECTION OF ITO(s)/PAS/DCR/a-Si/SIN/ITO(c)/GCR CORRESPONDING NO. 11

CROSS SECTION OF ITO(s)/PAS/DCR/a-Si/SIN/GCR/ITO(c) CORRESPONDING NO. 12

CROSS SECTION OF PAS/ITO(s)/DCR/a-Si/SIN/ITO(c)/GCR CONSTRUCTION (DCR/ASI BULK PROCESS) CORRESPONDING NOS. 13 AND 14

CROSS SECTION OF PAS/ITO(s)/DCR/a-Si/SIN/ITO(c)/GCR CORRESPONDING NO. 15

LIQUID CRYSTAL DISPLAY AND METHOD OF MANUFACTURING THE SAME

CROSS-REFERENCES TO RELATED APPLICATIONS

The present application is a Continuation Application of Ser. No. 10/388,834, filed Mar. 14, 2003 now U.S. Pat. No. 6,887,731, which is a Continuation Application of Ser. No. 09/764,197, filed Jan. 16, 2001 now abandoned, which is related to and claims priority to Japanese Patent Application No. 2000-009179, filed on Jan. 18, 2000, all of which are herein incorporated by reference in their entirety for all purposes.

BACKGROUND OF THE INVENTION

The present invention relates to a method of manufacturing a liquid crystal display device and, more particularly, to a method of manufacturing a liquid crystal display device called In-Plane Switching Mode.

A liquid crystal display device which is called "IPS mode (In-Plane Switching Mode)" has a construction in which a pixel electrode and a counter electrode which causes an electric field (a lateral electric field) parallel to transparent substrates to be generated between the counter electrode and the pixel electrode are formed in each pixel on the liquid-crystal-side surface of one of the transparent substrates disposed to oppose each other with a liquid crystal interposed therebetween.

The in-plane switching mode of liquid crystal display device is constructed so that the amount of light to be transmitted through the area between the pixel electrode and the counter electrode is controlled by the driving of the liquid crystal to which the electric field is applied.

Such a liquid crystal display device is known as a type which is superior in so-called wide viewing angle characteristics which enable a displayed picture to remain unchanged even when its display surface is observed from an oblique direction.

The pixel electrode and the counter electrode have so far been formed of a conductive layer which does not transmit light therethrough.

In recent years, a liquid crystal display device constructed in the following manner has been known: a counter electrode made of a transparent electrode is formed over the entire area of each pixel area except the periphery thereof, and stripe-shaped pixel electrodes made of transparent electrodes disposed to be extended in one direction and to be juxtaposed in a direction transverse to the one direction are formed over the counter electrode with an insulating film interposed therebetween.

The liquid crystal display device having this construction causes a lateral electric field to be generated between each pixel electrode and the corresponding counter electrode, and is still superior in wide viewing angle characteristics and is greatly improved in aperture ratio.

Incidentally, this art is described, for example, in SID (Society for Information Display) 99 DIGEST: pp. 202–205, or Japanese Patent Laid-Open No. 202356/1999. However, in the case where such in-plane switch mode is applied to an active matrix type of liquid crystal display device, the number of manufacturing steps, particularly, since the number of times of repetition of selective etching using a photolithographic technique reaches seven, it has been desired to decrease the number.

Since such a series of photolithographic techniques employs different photomasks for its respective photolithographic cycles, the positional deviation of the photomasks precludes the formation of a high-resolution pixel structure, and a complicated process cannot be avoided.

SUMMARY OF THE INVENTION

The present invention has been made on the basis of the above-described circumstances, and provides a liquid crystal display device which can be reduced in the number of manufacturing steps.

A representative aspect of the invention disclosed in the present application will be described below in brief.

According to the present invention, there is provided a method of manufacturing a liquid crystal display device in which, in each pixel area provided on a liquid-crystal-side surface of one of a pair of substrates disposed to oppose each other with a liquid crystal interposed therebetween, a signal from a drain line is applied to a pixel electrode via a drain electrode and a source electrode which are formed in a layer overlying a semiconductor layer of a thin film transistor, by supply of a scanning signal from a gate electrode which is positioned as an underlying layer with respect to the semiconductor layer, the manufacturing method comprising the steps of:

forming a stacked structure in which the semiconductor layer and a first conductive layer are sequentially stacked in the same pattern; and after forming a second conductive layer over the stacked structure, by using the same mask, providing separation between the drain electrode and the source electrode of the thin film transistor and also forming the pixel electrode connected to the source electrode.

In the method of manufacturing the liquid crystal display device constructed in this manner, the formation of the semiconductor layer of the thin film transistor, the formation of the drain line (the drain electrode and the source electrode) and the formation of the pixel electrode can be completed in two steps each, whereby it is possible to reduce the number of manufacturing steps.

BRIEF DESCRIPTION OF THE DRAWINGS

The invention will become more readily appreciated and understood from the following detailed description of preferred embodiments of the invention when taken in conjunction with the accompanying drawings, in which:

FIG. 3 is a process diagram showing one embodiment of a method of manufacturing the liquid crystal display device according to the present invention;

FIG. 4 is a process diagram showing another embodiment of the method of manufacturing the liquid crystal display device according to the present invention;

FIG. 5 is a process diagram showing another embodiment of the method of manufacturing the liquid crystal display device according to the present invention;

FIG. 6 is a process diagram showing another embodiment of the method of manufacturing the liquid crystal display device according to the present invention;

FIG. 7 is a process diagram showing another embodiment of the method of manufacturing the liquid crystal display device according to the present invention;

FIG. 8 is a table showing in list form other embodiments of the method of manufacturing the liquid crystal display device according to the present invention (inclusive of the above-described embodiments);

FIG. 9 is a cross-sectional view showing one embodiment of the layer structure of a pixel area of a liquid crystal display device formed by the manufacturing method according to the present invention;

FIG. 10 is a cross-sectional view showing another embodiment of the layer structure of the pixel area of the liquid crystal display device formed by the manufacturing method according to the present invention;

FIG. 11 is a cross-sectional view showing another embodiment of the layer structure of the pixel area of the liquid crystal display device formed by the manufacturing method according to the present invention;

FIG. 12 is a cross-sectional view showing another embodiment of the layer structure of the pixel area of the liquid crystal display device formed by the manufacturing method according to the present invention;

FIG. 13 is a cross-sectional view showing another embodiment of the layer structure of the pixel area of the liquid crystal display device formed by the manufacturing method according to the present invention;

FIG. 14 is a cross-sectional view showing another embodiment of the layer structure of the pixel area of the liquid crystal display device formed by the manufacturing method according to the present invention;

DESCRIPTION OF THE SPECIFIC EMBODIMENTS

Preferred embodiments of a method of manufacturing a liquid crystal display device according to the present invention will be described below with reference to the accompanying drawings.

Embodiment 1

Construction of Pixel

Figure 1:
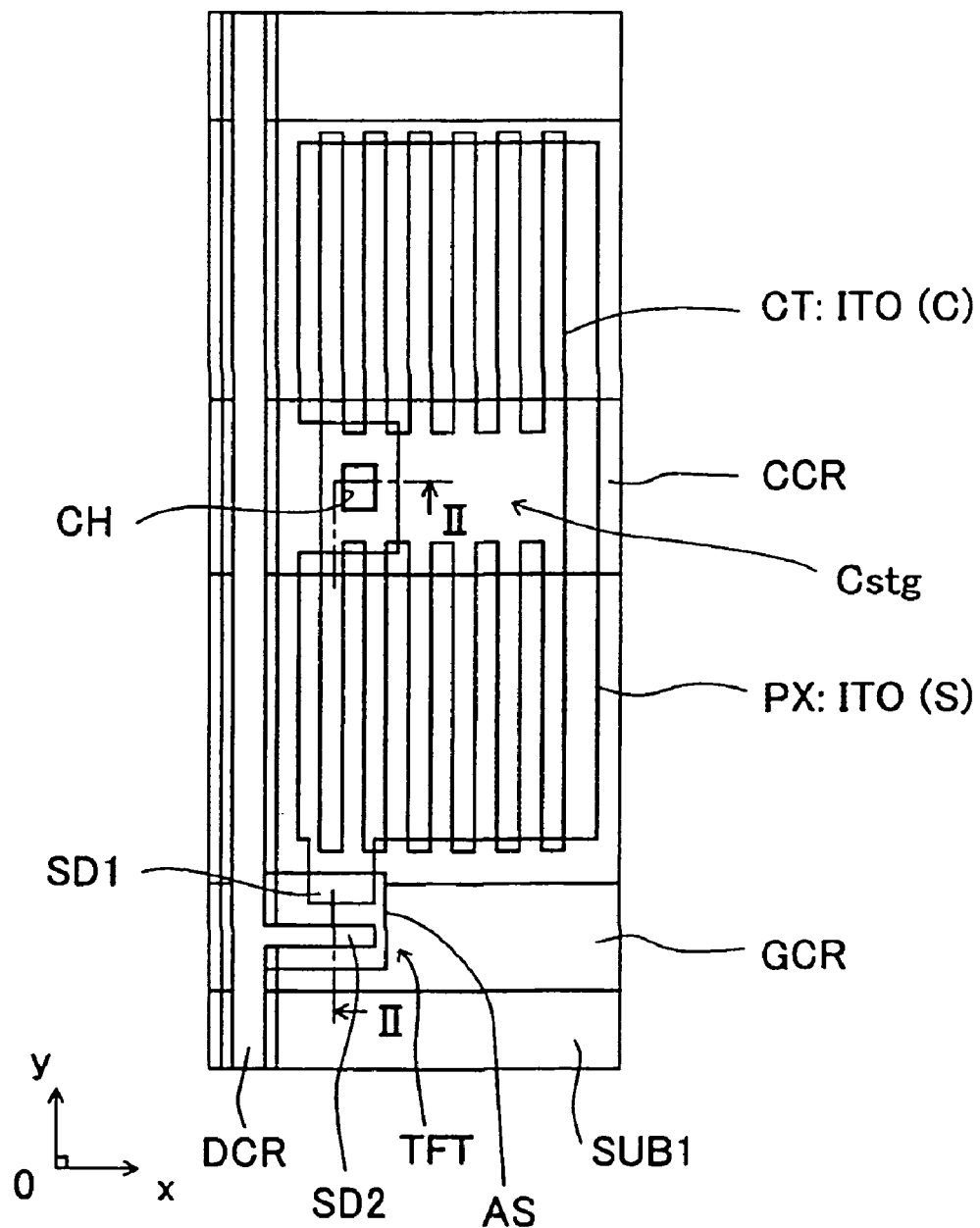
FIG. 1 is a plan view showing one embodiment of a pixel area of a liquid crystal display device according to the present invention.
Figure 2:
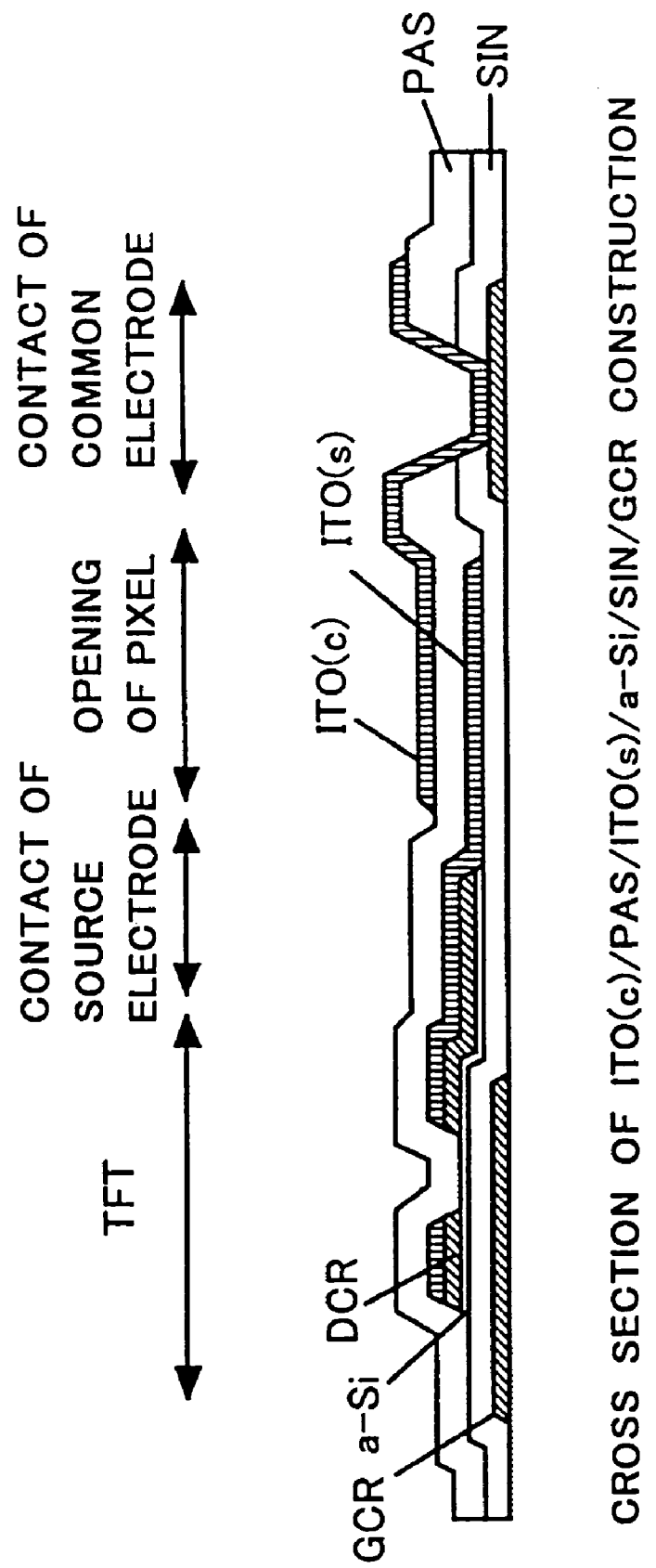
FIG. 2 is a cross-sectional view taken along line II—II of FIG. 1.
Figure 15:
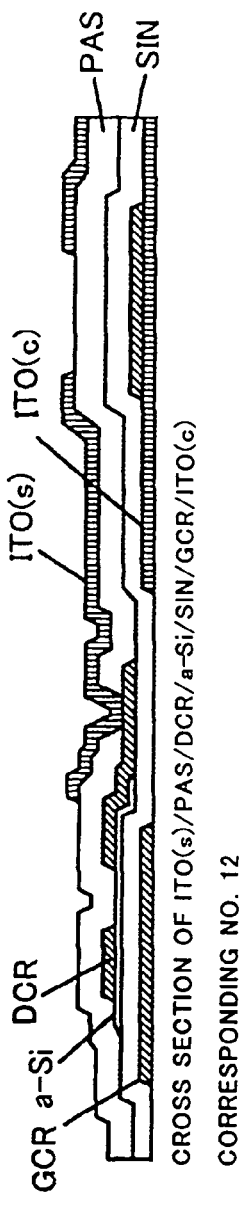
FIG. 15 is a cross-sectional view showing another embodiment of the layer structure of the pixel area of the liquid crystal display device formed by the manufacturing method according to the present invention.
Figure 16:
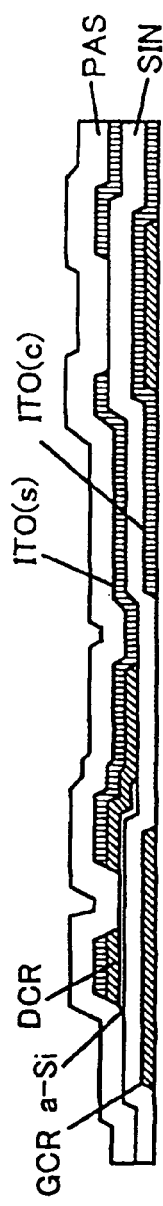
FIG. 16 is a cross-sectional view showing another embodiment of the layer structure of the pixel area of the liquid crystal display device formed by the manufacturing method according to the present invention.
Figure 17:
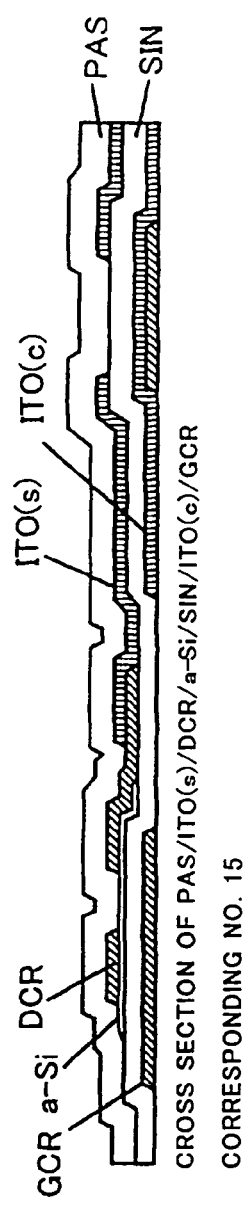
FIG. 17 is a cross-sectional view showing another embodiment of the layer structure of the pixel area of the liquid crystal display device formed by the manufacturing method according to the present invention.
Figure 18:
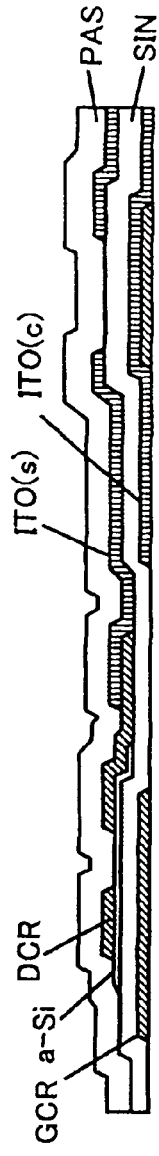
FIG. 18 is a cross-sectional view showing another embodiment of the layer structure of the pixel area of the liquid crystal display device formed by the manufacturing method according to the present invention.
Figure 19:
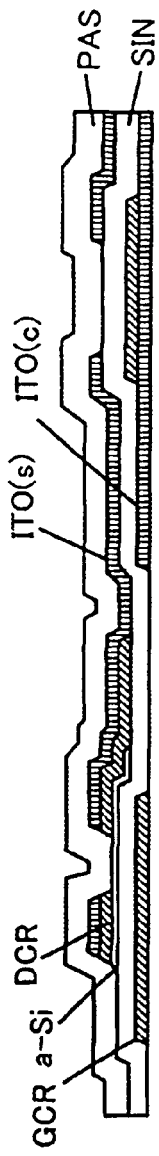
FIG. 19 is a cross-sectional view showing another embodiment of the layer structure of the pixel area of the liquid crystal display device formed by the manufacturing method according to the present invention.
Figure 20:
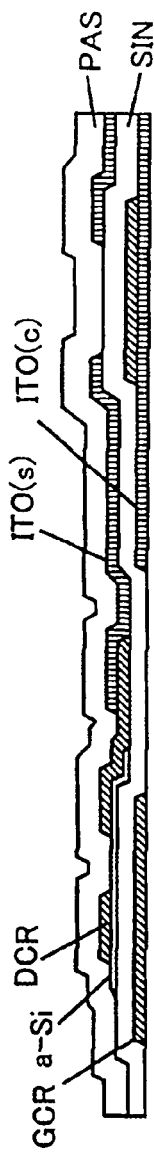
FIG. 20 is a cross-sectional view showing another embodiment of the layer structure of the pixel area of the liquid crystal display device formed by the manufacturing method according to the present invention.
Figure 21:
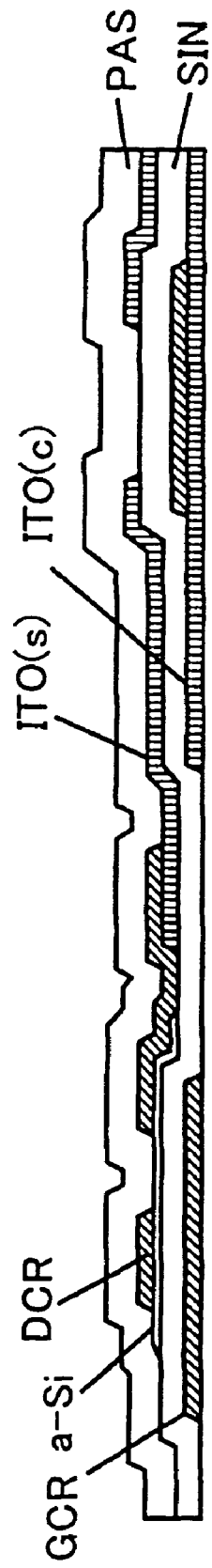
FIG. 21 is a cross-sectional view showing another embodiment of the layer structure of the pixel area of the liquid crystal display device formed by the manufacturing method according to the present invention.

FIG. 1 is a plan view showing one pixel of a liquid crystal display device to which the present invention is applied. FIG. 2 is a cross-sectional view taken along line II—II of FIG. 1.

In FIG. 1, there is shown a transparent substrate SUB1. This transparent substrate SUB1 is a so-called TFT substrate which is disposed to oppose a transparent substrate which is called a color filter substrate (not shown) with a liquid crystal interposed therebetween.

Gate lines GCR are formed over the liquid-crystal side surface of the transparent substrate SUB1 in such a manner as to be extended in the x-direction of FIG. 1 and to be juxtaposed in the y-direction of FIG. 1, while a counter voltage signal line CCR is formed over the same liquid-crystal side surface in such a manner as to be extended in the x-direction of FIG. 1 between each of the gate lines GCR. Each of the signal lines GCR and CCR is formed of the same metal layer, for example, a Cr layer.

An insulating film GI made of, for example, a silicon nitride film (SiN) is formed over the surface of the transparent substrate SUB1 in such a manner as to cover all of the signal lines GCR and CCR.

This insulating film GI has the function of an interlayer insulating film for insulating drain lines DCR (to be described later) from the gate lines GCR and the counter voltage signal lines CCR. The insulating film GI also has the function of a gate insulating film in each area in which a thin film transistor TFT which will be described below is formed, as well as the function of a dielectric film in each area in which a capacitance element Cstg which will be described below is formed.

As shown in the bottom left portion of FIG. 1, the thin film transistor TFT is formed over a portion of the gate line GCR of the pixel area, and a semiconductor layer AS is formed on the insulating film GI. This semiconductor layer AS is made of, for example, amorphous silicon (a-Si), and a high-concentration impurity layer which is doped with, for example, phosphorus (P) to serve as a contact layer is formed on the surface of the semiconductor layer AS.

Incidentally, this semiconductor layer AS is connected to that of the thin film transistor TFT, and is also formed in the area in which the drain line DCR which will be described later is formed in order to strengthen the function of an interlayer insulating film for insulating the drain line DCR from the gate line GCR and the counter voltage signal line CCR.

A drain electrode SD2 and a source electrode SD1 are formed on the upper surface of the semiconductor layer AS in the area in which the thin film transistor TFT is formed, whereby an inverted staggered structure MIS transistor is formed which uses a portion of the gate line GCR as its gate electrode. The drain electrode SD2 is formed integrally with the drain line DCR which will be described later.

Specifically, the drain line DCR which is disposed to be extended in the y-direction of FIG. 1 is formed of, for example, Cr, and a portion of the drain line DCR is formed to be extended to the semiconductor layer AS lying in the area in which the thin film transistor TFT is formed, whereby the drain electrode SD2 is formed.

The source electrode SD1 which is formed to oppose the drain electrode SD2 is formed by extending a portion of a pixel electrode PX which is formed in nearly the whole area of the central portion of the pixel area that excludes the peripheral narrow portion thereof.

Incidentally, in this embodiment, the same metal layer as the drain line DCR is formed to be interposed between the pixel electrode PX and the semiconductor layer AS (refer to FIG. 2). This pixel electrode PX is formed of, for example, a transparent conductive film made of ITO (Indium-Tin-Oxide), and is formed to avoid a portion of an area superposed on the counter voltage signal line CCR. This portion serves as a location which provides connection between a counter electrode CT and the counter voltage signal line CCR.

A protective film PAS which is made of, for example, a silicon nitride film (SiN) is formed over the whole area of the surface processed in this manner, and a contact hole CH is formed in the protective film PAS. The contact hole CH exposes a portion of the area of the counter voltage signal line CCR on which the pixel electrode PX is not superposed.

In addition, the counter electrode CT is formed on the surface of the protective film PAS. This counter electrode CT is made of, for example, a transparent conductive film made of ITO (Indium-Tin-Oxide), and is connected to the counter voltage signal line CCR through the contact hole CH.

The counter electrode CT is constructed of multiple stripe-shaped electrodes formed to be extended in the y-direction of FIG. 1 and to be juxtaposed in the x-direction of FIG. 1, and the portion of the counter electrode CT that is superposed on the counter voltage signal line CCR has a wide-area portion connected to the counter voltage signal line CCR.

The capacitance element Cstg is formed in this portion, and owing to the storage capacitance Cstg, the picture signal supplied from the drain line DCR through the thin film transistor TFT is stored in the pixel electrode PX for a long time when the thin-film transistor TFT is turned off.

Manufacturing Method

FIGS. 3A to 3E are process diagrams showing one example of a method of manufacturing the liquid crystal display device shown in FIG. 1.

Step 1 (FIG. 3A)

The transparent substrate SUB1 is prepared, and a metal film made of, example, Cr is formed over the entire liquid-crystal-side surface of the transparent substrate SUB1. The metal film is formed into a predetermined pattern by a selective etching method using a photolithographic technique.

Thus, the gate line GCR which is extended in the x-direction below the pixel area and the counter voltage signal line CCR which is extended in the x-direction in the central portion of the pixel area are formed over the surface of the transparent substrate SUB1.

Step 2 (FIG. 3B)

The insulating film GI made of, for example, a silicon nitride film (SiN) and the semiconductor layer AS made of amorphous silicon (a-Si) are sequentially formed over the entire surface of the transparent substrate SUB1 processed in this manner.

Incidentally, a contact layer doped with an impurity made of, for example, phosphorus (P) is formed on the surface of the semiconductor layer AS. In addition, a metal film made of, for example, Cr is formed over the entire surface of the transparent substrate SUB1.

Then, the metal film and the underlying semiconductor layer AS are formed into a predetermined pattern by a selective etching method using a photolithographic technique. The metal film and the semiconductor layer AS are etched in bulk into the same pattern.

Thus, the drain electrode SD2 and the source electrode SD1 which are integrally connected to each other are formed together with the drain line DCR (the semiconductor layer AS is formed in the same pattern below the drain electrode SD2 and the source electrode SD1).

Step 3 (FIG. 3C)

A transparent conductive film made of, for example, ITO (Indium-Tin-Oxide) is formed over the entire surface of the transparent substrate SUB1.

Then, the transparent conductive film and the metal film are formed into a predetermined pattern by a selective etching method using a photolithographic technique. The mask used for this photolithographic technique has a pattern including the drain line DCR, the drain electrode SD2 and the source electrode SD1 of the thin film transistor TFT, and the pixel electrode PX. These lines and electrodes can be formed with one mask because they are not formed in the state of being superposed on one another.

Specifically, a disconnection-preventing signal line to be superposed on the drain line DCR and the pixel electrode PX are formed by the selective etching of the transparent conductive film by the use of the mask (during this time, the transparent conductive film is etched along the patterns of the source electrode SD1 and the drain electrode SD2 of the thin film transistor TFT to be connected to the pixel electrode PX). Then, the drain electrode SD2 and the source electrode SD1 of the thin film transistor TFT are formed by the selective etching of the metal film that underlies the transparent conductive film.

After that, the contact layer on the surface of the semiconductor layer AS is etched by using the same mask. In this step, the drain line DCR (as well as the drain electrode SD2) is formed as part of a stacked structure in which the metal layer and the transparent conductive film and the drain line DCR are stacked in that order. Owing to this step, the disconnection-preventing signal line is formed in the state of being superposed on the drain line DCR, whereby it is possible to greatly decrease the probability that disconnection occurs in the drain line DCR.

Incidentally, the pixel electrode PX needs to be formed in a pattern which partly includes an area which is not superposed on the counter voltage signal line CCR. This portion is intended to provide connection between the counter voltage signal line CCR and the counter electrode CT which will be formed in a later step.

Step 4 (FIG. 3D)

The protective film PAS made of, for example, a silicon nitride film (SiN) is formed over the entire surface of the transparent substrate SUB1 processed in this manner.

Then, the contact hole CH is formed in the area in which the pixel electrode PX is not formed above the counter voltage signal line CCR, by a selective etching method using a photolithographic technique.

At the same time, openings in which to expose the terminals of the drain line DCR, the gate line GCR and the counter voltage signal line CCR are also formed in a portion except the pixel area.

Step 5 (FIG. 3E)

A transparent conductive film made of, for example, ITO is formed over the entire surface of the transparent substrate SUB1 processed in this manner, and the transparent conductive film is formed into a predetermined pattern by a selective etching method using a photolithographic technique, whereby the counter electrode CT is formed.

The counter electrode CT is formed to be superposed on the pixel electrode PX, and is formed of multiple stripe-shaped electrodes formed to be extended in the y-direction of FIG. 3E and to be juxtaposed in the x-direction of FIG. 3E.

Then, each of the stripe-shaped electrodes is connected to the others so that the area of the portion of the counter electrode CT that is superposed on the counter voltage signal line CCR is increased (for the purpose of forming the capacitance element cstg), and the counter electrode CT is connected to the counter voltage signal line CCR through the contact hole CH formed in the protective film PAS.

The method of manufacturing the liquid crystal display device constructed in this manner is completed by repeating five times the selective etching method using the photolithographic technique. Accordingly, it is possible to reduce the number of steps of the manufacturing process.

Embodiment 2

FIGS. 4A to 4E are process diagrams showing another embodiment of the liquid crystal display device according to the present invention.

Step 1 (FIG. 4A)

The transparent substrate SUB1 is prepared, and a metal film made of, example, Cr is formed over the entire liquid-crystal-side surface of the transparent substrate SUB1.

Thus, the gate line GCR and the counter voltage signal line CCR are formed.

Step 2 (FIG. 4B)

A transparent conductive film made of, for example, ITO (Indium-Tin-Oxide) is formed over the entire surface of the transparent substrate SUB1, and then the transparent conductive film is formed into a predetermined pattern by a selective etching method using a photolithographic technique.

Thus, the counter electrode CT connected to the counter voltage signal line CCR is formed over the central portion of the pixel area that excludes the peripheral narrow portion thereof.

Step 3 (FIG. 4C)

The insulating film GI made of, for example, a silicon nitride film (SiN) and the semiconductor layer AS made of amorphous silicon (a-Si) are sequentially formed over the entire surface of the transparent substrate SUB1 processed in this manner.

Incidentally, a contact layer doped with an impurity made of, for example, phosphorus (P) is formed on the surface of the semiconductor layer AS. In addition, a metal film made of, for example, Cr is formed over the entire surface of the transparent substrate SUB1.

Then, the metal film and the underlying semiconductor layer AS are formed into a predetermined pattern by a selective etching method using a photolithographic technique. The metal film and the semiconductor layer AS are etched in bulk into the same pattern.

Thus, the drain electrode SD2 and the source electrode SD1 which are integrally connected to each other are formed together with the drain line DCR (the semiconductor layer AS is formed in the same pattern below the drain electrode SD2 and the source electrode SD1).

Step 4 (FIG. 4D)

A transparent conductive film made of, for example, ITO (Indium-Tin-Oxide) is formed over the entire surface of the transparent substrate SUB1.

Then, the transparent conductive film and the metal film are formed into a predetermined pattern by a selective etching method using a photolithographic technique. The mask used for this photolithographic technique has a pattern including the drain line DCR, the drain electrode SD2 and the source electrode SD1 of the thin film transistor TFT, and the pixel electrode PX. These lines and electrodes can be formed with one mask because they are not formed in the state of being superposed on one another.

Specifically, a disconnection-preventing signal line to be superposed on the drain line DCR and the pixel electrode PX are formed by the selective etching of the transparent conductive film by the use of the mask (during this time, the transparent conductive film is etched along the patterns of the source electrode SD1 and the drain electrode SD2 of the thin film transistor TFT to be connected to the pixel electrode PX). Then, the drain electrode SD2 and the source electrode SD1 of the thin film transistor TFT are formed by the selective etching of the metal film that underlies the transparent conductive film.

The pixel electrode PX is formed of multiple stripe-shaped electrodes formed to be extended in the y-direction of FIG. 4D and to be juxtaposed in the x-direction of FIG. 4D, and the portion of the pixel electrode PX that is superposed on the counter voltage signal line CCR has a comparatively large area. At this portion, the capacitance element Cstg is formed.

After that, the contact layer on the surface of the semiconductor layer AS is etched by using the same mask.

Step 5 (FIG. 4E)

The protective film PAS made of, for example, a silicon nitride film (SiN) is formed over the entire surface of the transparent substrate SUB1 processed in this manner.

Then, openings for exposing the terminals of the drain line DCR, the gate line GCR and the counter voltage signal line CCR are formed in a portion except the pixel area by a selective etching method using a photolithographic technique.

The method of manufacturing the liquid crystal display device constructed in this manner is completed by repeating five times the selective etching method using the photolithographic technique, whereby it is possible to reduce the number of steps of the manufacturing process.

Embodiment 3

FIGS. 5A to 5F are process diagrams showing another embodiment of the method of manufacturing the liquid crystal display device according to the present invention.

Step 1 (FIG. 5A)

The transparent substrate SUB1 is prepared, and a metal film made of, example, Cr is formed over the entire liquid-crystal-side surface of the transparent substrate SUB1, and the metal film is formed into a predetermined pattern by a selective etching method using a photolithographic technique.

Thus, the gate line GCR and the counter voltage signal line CCR are formed.

Step 2 (FIG. 5B)

A transparent conductive film made of, for example, ITO (Indium-Tin-Oxide) is formed over the entire surface of the transparent substrate SUB1, and then the transparent conductive film is formed into a predetermined pattern by a selective etching method using a photolithographic technique.

Thus, the counter electrode CT connected to the counter voltage signal line CCR is formed over the central portion of the pixel area that excludes the peripheral narrow portion thereof.

Step 3 (FIG. 5C)

An insulating film made of, for example, a silicon nitride film (SiN) is formed over the entire surface of the transparent substrate SUB1.

After that, openings for exposing the terminals of the gate line GCR and the counter voltage signal line CCR are formed in a portion except the pixel area by a selective etching method using a photolithographic technique.

Step 4 (FIG. 5C)

The insulating film GI made of, for example, a silicon nitride film (SiN) and the semiconductor layer AS made of amorphous silicon (a-Si) are sequentially formed over the entire surface of the transparent substrate SUB1 processed in this manner.

Incidentally, a contact layer doped with an impurity made of, for example, phosphorus (P) is formed on the surface of the semiconductor layer AS. In addition, a metal film made of, for example, Cr is formed over the entire surface of the transparent substrate SUB1.

Then, the metal film and the underlying semiconductor layer AS are formed into a predetermined pattern by a selective etching method using a photolithographic technique. The metal film and the semiconductor layer AS are etched in bulk into the same pattern.

Thus, the drain electrode SD2 and the source electrode SD1 which are connected to each other are formed together with the drain line DCR (the semiconductor layer AS is formed in the same pattern below the drain electrode SD2 and the source electrode SD1).

Step 5 (FIG. 5E)

A transparent conductive film made of, for example, ITO (Indium-Tin-Oxide) is formed over the entire surface of the transparent substrate SUB1.

Then, the transparent conductive film and the metal film are formed into a predetermined pattern by a selective etching method using a photolithographic technique. The mask used for this photolithographic technique has a pattern including the drain line DCR, the drain electrode SD2 and the source electrode SD1 of the thin film transistor TFT, and the pixel electrode PX.

Specifically, the drain line DCR and the pixel electrode PX are formed by the selective etching of the transparent conductive film using the mask (in this case, etching is effected along the patterns of the source electrode SD1 and the drain electrode SD2 to be connected to the pixel electrode PX), and the drain electrode SD2 and the source electrode SD1 of the thin film transistor TFT are formed by the selective etching of the metal film which underlies the transparent conductive film.

After that, the contact layer on the surface of the semiconductor layer AS is etched by using the same mask.

Step 6 (FIG. 5F)

The protective film PAS made of, for example, a silicon nitride film (SiN) is formed over the entire surface of the transparent substrate SUB1 processed in this manner.

Then, openings for exposing the terminals of the drain line DCR, the gate line GCR and the counter voltage signal line CCR are formed in a portion except the pixel area by a selective etching method using a photolithographic technique.

The method of manufacturing the liquid crystal display device constructed in this manner is completed by repeating five times the selective etching method using the photolithographic technique, whereby it is possible to reduce the number of steps of the manufacturing process.

Embodiment 4

FIGS. 6A to 6F are process diagrams showing another embodiment of the method of manufacturing the liquid crystal display device according to the present invention.

Step 1 (FIG. 6A)

The transparent substrate SUB1 is prepared, and a metal film made of, example, Cr is formed over the entire liquid-crystal-side surface of the transparent substrate SUB1, and the metal film is formed into a predetermined pattern by a selective etching method using a photolithographic technique.

Thus, the gate line GCR and the counter voltage signal line CCR are formed.

Step 2 (FIG. 6B)

The insulating film GI made of, for example, a silicon nitride film (SiN) and the semiconductor layer AS made of amorphous silicon (a-Si) are sequentially formed over the entire surface of the transparent substrate SUB1 processed in this manner.

Incidentally, a high-concentration impurity layer for formation of a contact layer doped with an impurity made of, for example, phosphorus (P) is formed on the surface of the semiconductor layer AS.

Then, the semiconductor layer AS is formed into a predetermined pattern by a selective etching method using a photolithographic technique.

Thus, the semiconductor layer AS is left in an area in which to form the thin film transistor TFT and in an area in which to form the drain line DCR.

The reason why the semiconductor layer AS is allowed to remain in the area in which to form the drain line DCR is to improve the function of an interlayer insulating film for insulating the drain line DCR (to be formed later) from the gate line GCR and the counter voltage signal line CCR.

Step 3 (FIG. 6C)

A metal film made of for example, Cr is formed over the entire surface of the transparent substrate SUB1.

Then, the metal film is formed into a predetermined pattern by a selective etching method using a photolithographic technique, thereby forming the drain line DCR and the drain electrode SD2 and the source electrode SD1 of the thin film transistor TFT.

Step 4 (FIG. 6D)

A transparent conductive film made of for example, ITO (Indium-Tin-Oxide) is formed over the entire surface of the transparent substrate SUB1.

Then, the transparent conductive film is formed into a predetermined pattern by a selective etching method using a photolithographic technique, thereby forming the pixel electrode PX and a disconnection-preventing signal line.

The pixel electrode PX is formed to be connected to the source electrode SD1 of the thin film transistor TFT. Excepting a part of the portion of the pixel electrode PX that is superposed on the counter voltage signal line CCR, the pixel electrode PX is formed over the entire area of the central portion of the pixel area that excludes the peripheral narrow portion thereof, and the disconnection-preventing signal line is formed to be superposed on the drain line DCR.

After that, the high-concentration impurity layer formed on the surface of the semiconductor layer AS is etched by using as a mask the drain electrode SD2 and the source electrode SD1 of the thin film transistor TFT.

Step 5 (FIG. 6E)

The protective film PAS made of, for example, a silicon nitride film (SiN) is formed over the entire surface of the transparent substrate SUB1 processed in this manner.

The contact hole CH which exposes a portion of the area of the counter voltage signal line CCR over which the pixel electrode PX is not formed is formed in the protective film PAS by a selective etching method using a photolithographic technique.

At the same time, openings for exposing the terminals of the drain line DCR, the gate line GCR and the counter voltage signal line CCR are formed in a portion except the pixel area.

Step 6 (FIG. 6F)

A transparent conductive film made of, for example, ITO (Indium-Tin-Oxide) is formed over the entire surface of the transparent substrate SUB1.

Then, the transparent conductive film is formed into a predetermined pattern by a selective etching method using a photolithographic technique, thereby forming the counter electrode CT.

The counter electrode CT is formed to be connected to the counter voltage signal line CCR through the contact hole CH and to be superposed on the pixel electrode PX. The counter electrode CT is formed of multiple stripe-shaped electrodes disposed to be extended in the y-direction of FIG. 6F and to be juxtaposed in the x-direction of FIG. 6F.

The method of manufacturing the liquid crystal display device constructed in this manner is completed by repeating five times the selective etching method using the photolithographic technique, whereby it is possible to reduce the number of steps of the manufacturing process.

[Embodiment 5]

FIGS. 7A to 7F are process diagrams showing another embodiment of the method of manufacturing the liquid crystal display device according to the present invention.

Step 1 (FIG. 7A)

The transparent substrate SUB1 is prepared, and a metal film made of, example, Cr is formed over the entire liquid-crystal-side surface of the transparent substrate SUB1, and the metal film is formed into a predetermined pattern by a selective etching method using a photolithographic technique.

Thus, the gate line GCR and the counter voltage signal line CCR are formed.

Step 2 (FIG. 7B)

A transparent conductive film made of, for example, ITO (Indium-Tin-Oxide) is formed over the entire surface of the transparent substrate SUB1.

Then, the transparent conductive film and the metal film are formed into a predetermined pattern by a selective etching method using a photolithographic technique, thereby forming the counter electrode CT connected to the counter voltage signal line CCR.

Step 3 (FIG. 7C)

The insulating film GI made of, for example, a silicon nitride film (SiN) and the semiconductor layer AS made of amorphous silicon (a-Si) are sequentially formed over the entire surface of the transparent substrate SUB1 processed in this manner.

Incidentally, a high-concentration impurity layer for formation of a contact layer doped with an impurity made of, for example, phosphorus (P) is formed on the surface of the semiconductor layer AS.

Then, the semiconductor layer AS is formed into a predetermined pattern by a selective etching method using a photolithographic technique.

Step 4 (FIG. 7D)

In addition, a metal film made of, example, Cr is formed over the entire liquid-crystal-side surface of the transparent substrate SUB1.

Then, the metal film is formed into a predetermined pattern by a selective etching method using a photolithographic technique, thereby forming the drain line DCR and the drain electrode SD2 and the source electrode SD1 of the thin film transistor TFT.

After that, the high-concentration impurity layer formed on the surface of the semiconductor layer AS is etched by using as a mask the drain electrode SD2 and the source electrode SD1 of the thin film transistor TFT.

Step 5 (FIG. 7E)

The protective film PAS made of, for example, a silicon nitride film (SiN) is formed over the entire surface of the transparent substrate SUB1 processed in this manner.

The contact hole CH which exposes a portion of the source electrode SD1 of the thin film transistor TFT is formed in the protective film PAS by a selective etching method using a photolithographic technique.

At the same time, openings for exposing the terminals of the drain line DCR, the gate line GCR and the counter voltage signal line CCR are formed in a portion except the pixel area.

Step 6 (FIG. 7F)

A transparent conductive film made of, for example, ITO (Indium-Tin-Oxide) is formed over the entire surface of the transparent substrate SUB1.

Then, the transparent conductive film is formed into a predetermined pattern by a selective etching method using a photolithographic technique, thereby forming the pixel electrode PX.

The pixel electrode PX is formed to be connected to the source electrode SD1 of the thin film transistor TFT through the contact hole CH and to be superposed on the counter electrode CT.

Then, the pixel electrode PX is formed of multiple stripe-shaped electrodes disposed to be extended in the y-direction of FIG. 7F and to be juxtaposed in the x-direction of FIG. 7F.

Other Embodiments

Although the above-described embodiments have been referred to as representative examples, there are various other embodiments. Such various other embodiments as well as the above-described embodiments are listed in FIG. 8

The table of FIG. 8 shows in list form layer structures each formed by the method of manufacturing the liquid crystal display device according to the present invention, the number of times of repetition of selective etching using a photolithographic technique, which selective etching is utilized for the manufacturing of each of the layer structures (the number of times of repetition of photolithography), and characteristic means which contributes to a reduction in the number of times of repetition of photolithography (means for reducing the number of times of repetition of photolithography).

In the table, the term "DCR/ASI bulk process" signifies the process of sequentially stacking the insulating film GI, the semiconductor layer AS and the metal layer and effecting selective etching of the metal layer and the underlying semiconductor layer AS in accordance with the same pattern and, at the same time, forming the drain electrode SD2 and the source electrode SD1 in an integrally interconnected state over the semiconductor layer AS in the area in which to form the thin film transistor TFT.

As described previously, the separation between the drain electrode SD2 and the source electrode SD1 can be effected by selective etching which is performed when the pixel electrode PX is being formed at a later step.

The term "PAS/SIN bulk process" signifies the process of forming the insulating film GI and further the protective film PAS thereon and then sequentially effecting selective etching of the protective film PAS and the insulating film GI in each of areas in which to form the respective terminals of the signal lines, and, at the same time, forming openings such as contact holes in the protective film PAS if such openings need to be formed.

In FIG. 8, the respective manufacturing methods are denoted by No. 1 to No. 22, and the manufacturing methods No. 4, No. 6, No. 11, No. 13 and No. 14 correspond to the above-described Embodiments 1 to 5 shown in FIGS. 3, 6, 7, 4 and 5.

The respective layer structures of the pixel areas formed by the individual manufacturing methods are shown in FIGS. 9 to 21. The number or numbers shown in each of the figures indicate the layer structure formed by the manufacturing method or methods denoted by the corresponding one or ones of the numbers shown in FIG. 8.

Incidentally, each of FIGS. 9 to 21 shows a cross-sectional view of the same portion of the pixel shown in FIG. 1.

As is apparent from the foregoing description, in accordance with the method of manufacturing the liquid crystal display device according to the present invention, it is possible to reduce the number of manufacturing steps.

What is claimed is:

1. A liquid crystal display device comprising:
a pair of opposing substrates, at least one of said pair of opposing substrates being transparent;
a plurality of pixel electrodes and a plurality of counter electrodes formed on one of the substrates, wherein the counter electrodes are arranged at a layer lower than that of the pixel electrodes with at least an insulating layer disposed therebetween; and
a connecting member arranged at a layer higher than that of the counter electrodes, the connecting member electrically connected to one of the counter electrodes and to a counter voltage signal line that is spaced apart from the counter electrodes.

2. A liquid crystal display device according to claim 1, wherein the connecting member is formed on the insulation layer, the device further comprising a first contact hole which connects the connecting member and one of the counter electrodes; and a second contact hole different from the first contact hole which connects the connecting member and the counter voltage signal line.

3. A liquid crystal display device according to claim 2, wherein the connecting member is disposed on the same layer as that of the pixel electrodes.

4. A liquid crystal display device according to claim 3, wherein the counter electrode and the pixel electrodes each is a transparent conductor material.

5. A liquid crystal display device according to claim 3, wherein the transparent conductor material is ITO (indium-tin-oxide).

6. A liquid crystal display device comprising:
a pair of opposing substrates, at least one of said pair of opposing substrates being transparent;
a plurality of pixel regions, each pixel region defined by a pixel electrode and a thin film transistor; and
three contact holes formed in each pixel region,
wherein a first of the three contact holes connects the pixel electrode and the thin film transistor, a second of the three contact holes is connected to a common electrode, and a third of the three contact holes is connected to a common line.

7. A liquid crystal display device according to claim 6, further comprising a member disposed in the same layer as that of the pixel electrodes and spaced apart from the pixel electrodes, the member in contact with the common electrode at the second contact hole.

8. A liquid crystal display device according to claim 7, wherein the pixel electrode and the member each is transparent conductor material.

9. A liquid crystal display device according to claim 8, wherein the transparent conductor material is ITO.

10. A liquid crystal display device according to claim 8, wherein the common electrode is arranged at lower layer than that of the pixel electrode having at least an insulating layer disposed therebetween.

11. A liquid crystal display device according to claim 7, wherein both ends of the member connect with the common electrode through a contact hole.

12. A liquid crystal display device according to claim 11, wherein length of the member is less than the length of the pixel electrode.

13. A liquid crystal display device comprising:
a pair of opposing substrates, at least one of said pair of opposing substrates being transparent;
a pixel electrode and a thin film transistor formed in a pixel region;
a first conductive member and a second conductive member separated from the first conductive member, the first conductive member and the pixel electrode overlapping in a region with an insulating layer therebetween;
a connecting member which connects the first conductive member and the second conductive member; and
two contact holes in a pixel region to connect the conductive members.

14. A liquid crystal display device according to claim 13, wherein the connecting member is in the same layer as that of the pixel electrode.

15. A liquid crystal display device according to claim 14, wherein the first conductive member and the second conductive member each is absent any connection to a gate line and to a drain line.

16. A liquid crystal display device according to claim 15, wherein length of the connecting member is less than that of the pixel electrode.

* * * * *